No. 816,320. PATENTED MAR. 27, 1906.
W. L. HARRIS.
COMBINED HOE AND RAKE.
APPLICATION FILED DEC. 27, 1904.
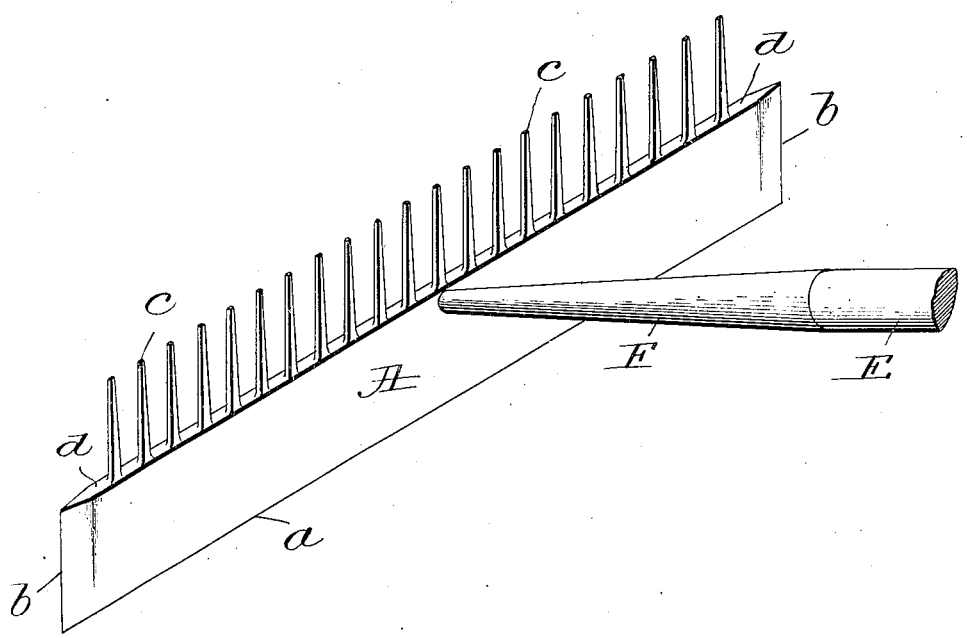
Witnesses:
Fred S. Grunbach
J. Wm. Lutton
Inventor.
Walter L. Harris,
by Dooley Gregory
Attys.

UNITED STATES PATENT OFFICE.

WALTER L. HARRIS, OF SALEM, MASSACHUSETTS.

COMBINED HOE AND RAKE.

No. 816,320.     Specification of Letters Patent.     Patented March 27, 1906.

Application filed December 27, 1904. Serial No. 238,376.

*To all whom it may concern:*

Be it known that I, WALTER L. HARRIS, a citizen of the United States, residing at Salem, county of Essex, and State of Massachusetts, have invented an Improvement in a Combined Hoe and Rake, of which the following description, in connection with the accompanying drawing, is a specification, like letters on the drawing representing like parts.

This invention relates to improvements in combined hoes and rakes, and is especially designed for use in work around lawns and walks, paths, and avenues which it is desired to free from weeds.

The object of the invention is to provide such a device of simple construction which shall be adapted to reach spots inaccessible to the ordinary garden-hoe and to clean the edges of walks, paths, avenues, or the like where they are bordered with grass.

The accompanying single figure of drawing represents in perspective the preferred embodiment of my invention.

The device consists of a relatively long and narrow hoe-blade A. This blade has its edge sharpened, as at $a$, and the ends of the blade are also sharpened, as shown at $b$. By "sharpened" it is meant that the edge and ends of the hoe-blade are brought to an edge such as required in an ordinary garden-hoe.

A series of rake-teeth C are formed, projecting from the back of the hoe-blade A and are preferably made integral therewith. This series of rake-teeth extend over only the middle portion of the back of the hoe-blade, leaving the end portions of the back $d$ free from teeth. This is a special feature of this invention, because thereby the sharpened ends of the hoe-blade can be used to reach otherwise inaccessible spots or to trim along the edges or borders of a walk, path, avenue, or the like, and in doing so the teeth in no way interfere with the use of the device.

In raking the grass or scratching the ground or in similar uses the device is used with the rake-teeth C downwardly, as in the case of an ordinary rake. In hoeing or scraping or cutting the sharpened edge A is used downwardly, as in the case of an ordinary hoe; but being made long and narrow it cleans a greater area. When inaccessible spots are reached, or when it is desired to dig out a single weed, or when it is desired to trim in the corners or edges of a walk path, avenue, or the like, the device is turned so as to bring either of the hoe edges $b$ into proper working position.

A common form of handle E is provided, which may be attached to the device by means of a socket F, rigidly secured thereto, as shown, or by any other suitable means.

The handle is shown as perpendicular to the plane of the rake-teeth and hoe-blade; but the teeth may, if desired, be slightly curved toward the handle, as in the case of a garden-rake, and the hoe-blade may likewise be bent slightly toward the handle.

The entire device will be found extremely simple, strong, and efficient in its operation.

Having described my invention, what I claim as new, and desire to secure by Letters Patent, is—

A combined rake and hoe consisting of a relatively long and narrow hoe-blade sharpened throughout its long front edge and at both its narrow ends, a series of rake-teeth projecting from the middle portion but not the ends of the back edge of said blade whereby either end as well as the front edge of the hoe-blade may be used without interfering with the rake-teeth, and a handle therefor.

In testimony whereof I have signed my name to this specification in the presence of two subscribing witnesses.

WALTER L. HARRIS.

Witnesses:
     NATHAN HEARD,
     MABEL PARTELOW.